Patented Nov. 7, 1922.                                                                                  1,435,039

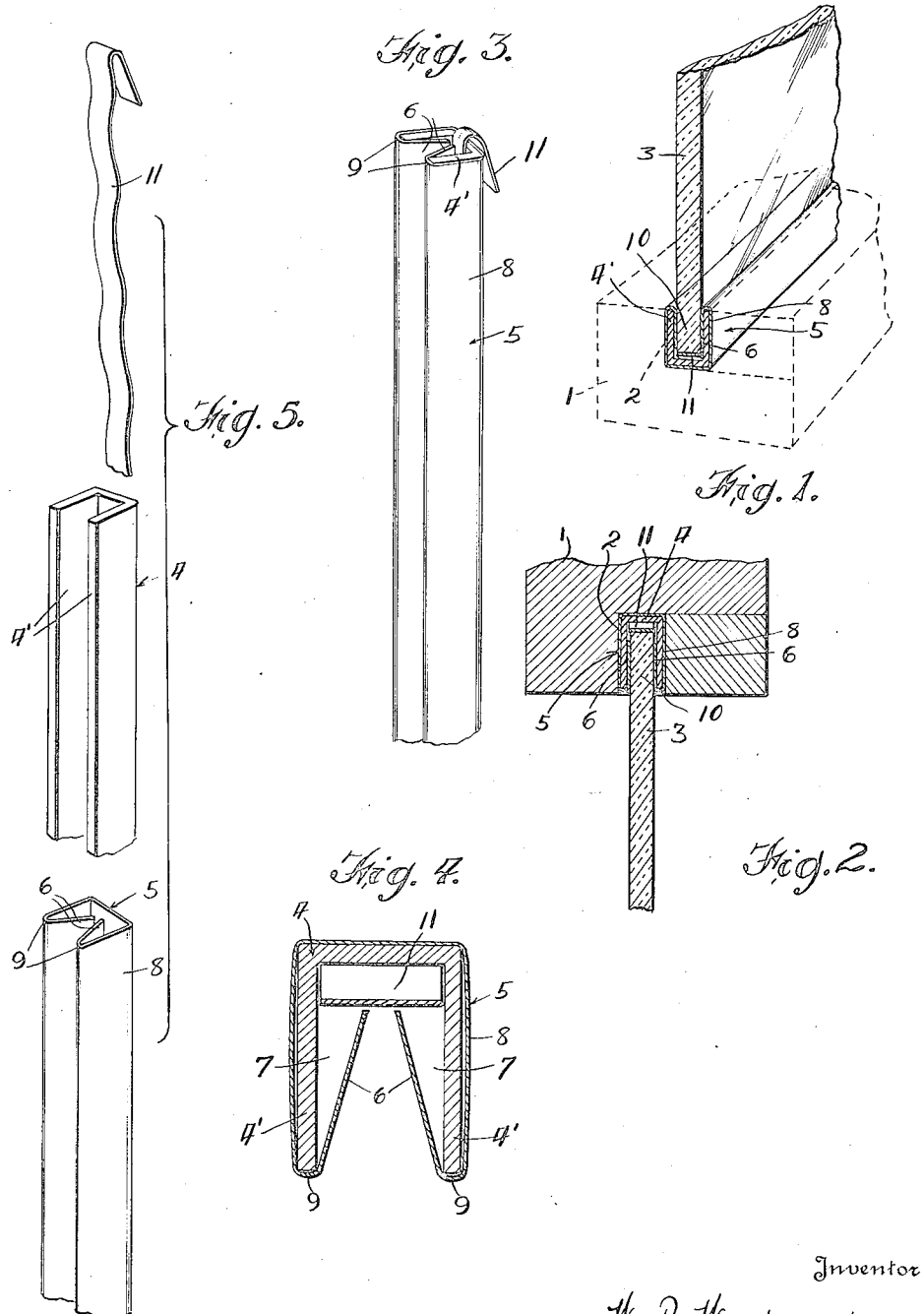

UNITED STATES PATENT OFFICE.

WELLINGTON R. WOODWARD, OF AMESBURY, MASSACHUSETTS.

ANTIRATTLING CHANNEL FOR WINDOWS.

Application filed October 18, 1921. Serial No. 508,426.

*To all whom it may concern:*

Be it known that I, W. R. WOODWARD, a citizen of the United States, resident of Amesbury, in the county of Essex and State of Massachusetts, have made a certain new and useful Invention in Antirattling Channels for Windows; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a perspective view of the invention as applied.

Figure 2 is a cross section of the invention as applied.

Figure 3 is a perspective view of the invention.

Figure 4 is a cross section of the invention on a larger scale.

Figure 5 shows perspective views of the parts of the invention.

The invention has relation to weather strips or antirattling means for the sliding lights or glass panes of windows and doors, designed mainly for use with the doors or windows of closed automobile bodies, an object being to provide a more rigid and substantial device which will have a longer life and better retain its shape and efficiency.

The invention consists in the novel construction and combinations of parts, as hereinafter set forth.

In the accompanying drawings illustrating the invention, the numeral 1 designates the door or window frame having vertical grooves 2, wherein is located the glass pane 3 slidable upwardly and downwardly therein.

It has been customary hitherto to line this groove with or form this groove of a suitable metal in channel form and covered or lined with felt or the like, the slidable glass working in the groove and having the vibration or rattle thereof taken up by the soft yielding felt. It has also been customary to provide spring metal flanges at each side of the groove and having yielding or elastic contact with the slidable glass.

In the present instance the groove wherein the glass slides, will also be formed in channel metal, i. e. a channel metal strip 4 will be located in the vertical groove 2 at each side of the window opening of the door or window frame, aluminum or other metal being used, and surrounding this metal strip which is of substantial rigid construction or nature, is a second and outer channel metal strip or envelop 5 of lighter nature, and having inner converging spring flanges 6, spaced from the inner side walls or flanges 4′ of the strip 4 by intervals 7. The outer flanges 8 of the lighter metal strip 5, are thus located upon the outer sides of the flanges 4′ of the strip 4, and the inner flanges 6 are located adjacent to the inner sides of the flanges 4′, the flanges 6 and 8 of the lighter strip being respectively joined by a bend 9, acting as a hinge or pivot upon which the inner flanges 6 are movable relative to the flanges 8.

The glass pane is shown at 10 and fits within the channeled strips in contact with the flanges 6, which being of elastic or spring nature will respectively yield as a whole or bodily upon the bend 9 as a center to form a tight joint between the glass and the metal strip, any lateral movement inwardly or outwardly of the glass being taken up by the spring flanges, whereby rattle of the glass in the channeled strips will be prevented, and dust and the weather will be excluded.

Obviously glass of varying thicknesses may be used with this invention, the spring flanges having a sufficient range of movement to receive the different thicknesses without affecting the free movement of the glass upwardly and downwardly while retaining the advantages stated.

In order to take up any edgewise vibration of the glass, a narrow serpentine or wave-form strip of spring metal or brass 11 is located in the channel of the metal strips between the bottom wall of the strip 4 and the free ends of the spring flanges 6, the strips 11 having contact with the vertical edges of the glass 10 or of the window sash, and preventing edgewise movement of the glass or sash in either direction, or cushioning the same so that rattle is prevented.

This device is designed to stand up well in use and to retain its efficiency for an indefinite period.

Owing to the use of the rigid metal strip which forms the core or body of the device, the outer strip having the spring flanges may be made of lighter and more yieldable material, without lessening the advantages stated, while making the working or sliding of the glass upwardly and downwardly more easily accomplished.

I claim:—

1. In a weather strip and anti-rattler, the combination of a rigid channel metal body strip having a back wall and side flanges, and a light spring metal channel strip surrounding the body strip and carried thereby, said spring strip having a spring flange located within the channel of and laterally movable relative to a side flange of the body strip.

2. In a weather strip and anti-rattler, the combination of a rigid channel metal body strip having a back wall and side flanges, and a light spring metal channel strip having also a back wall and side flanges and carried by and surrounding the body strip, said spring strip having spring flanges located within the channel and movable laterally relative to the side flanges of the body strip, the spring flanges and the side flanges of the spring strip having bend connections.

3. In a weather strip and anti-rattler, the combination of a rigid channel metal body strip having a back wall and side flanges, and a light spring metal channel strip having also a back wall and side flanges and carried by and surrounding said body strip, said spring having spring flanges located within the channel and movable laterally relative to the side flanges of the body strip, and a serpentine spring strip located in the channel of the body strip between the back wall thereof and the free ends of said spring flanges.

In testimony whereof I affix my signature, in presence of two witnesses.

WELLINGTON R. WOODWARD.

Witnesses:
EDMUND R. ARNOLD,
GEORGE W. WELLS.